United States Patent Office 3,563,946
Patented Feb. 16, 1971

3,563,946
PROCESS FOR LATEX MANUFACTURE
Frederick A. Miller, Midland, Robert J. Pueschner, St. Louis, Carl L. Dibert, Hemlock, and Dennis A. Kee, Midland, Mich., assignors to The Dow Chemical Company, Midland, Mich., a corporation of Delaware
No Drawing. Continuation-in-part of application Ser. No. 470,904, July 9, 1965. This application Jan. 8, 1968, Ser. No. 696,121
Int. Cl. C08d 1/09, 3/02
U.S. Cl. 260—29.7           9 Claims

ABSTRACT OF THE DISCLOSURE

A process for preparing synthetic latexes by emulsion polymerization of monomer compositions containing at least 30 percent by weight of a conjugated diethylenically unsaturated monomer such as 1,3-butadiene by (a) substantially concurrently and substantially continuously feeding at least one aqueous stream and at least one oily stream containing at least a portion of the monomer composition, each stream being at a temperature between its freezing point and 50° C., into a closed polymerization zone maintained at a temperature of at least about 90° C.; also feeding, optionally continuously, a free-radical producing compound into the polymerization zone either in a separate stream or as a portion of one of the continuous streams and (b) agitating the resulting mixture until polymerization is substantially complete.

CROSS-REFERENCE TO RELATED APPLICATION

This application is a continuation-in-part of copending application, Ser. No. 470,904, filed July 9, 1965, and now abandoned.

BACKGROUND OF THE INVENTION (1) Field of the invention

This invention relates to an improved process for preparing latexes. More particularly, it is concerned with emulsion polymerization of ethylenically unsaturated monomers, especially monomers or monomer mixtures having high vapor pressure and high heat of polymerization.

(2) Description of the prior art

Aqueous dispersions of polymers known as latexes have unquestioned great commercial use and value at the present time. Latexes having differing polymer and copolymer compositions are well known for a variety of uses such as coatings and impregnants either alone or in a variety of formulations. The obtention of markedly increased production of latexes in the same amount of time from the same amount and complexity of equipment (or alternatively the production of the same amount of product in markedly reduced time) is a readily acknowledged desideratum in commercial operations. Also, in the preparation of latexes by the prior batchwise techniques the polymerization temperature has frequently been difficult to control resulting in poor reproducibility of latex product from batch to batch. In not infrequent cases, the polymerization has become what is popularly referred to as a runaway (i.e., an uncontrolled polymerization where the heat generated by the exothermic polymerization reaction exceeds the heat transfer capacity of the polymerization equipment). It would be desirable to have an improved polymerization process for preparing latexes whereby more effective control of the polymerization temperature could be obtained in the same amount of time.

SUMMARY OF THE INVENTION

It has been discovered, and this discovery is the subject of this invention, that substantially complete polymerization in shorter periods of time with excellent control of the temperature of the polymerization media is achieved by a new emulsion polymerization process having certain critical characteristics and conditions. The invention resides in a batch process comprising essential conditions as follows:

In one aspect of the invention a polymerizable, ethylenically unsaturated monomeric composition is emulsion polymerized by the essential steps of (1) Substantially concurrently and substantially continuously feeding at least two separate streams into a closed polymerization zone maintained at a temperature of at least about 90° C. and under autogeneous pressure;

(a) the streams are at a temperature between their freezing point and about 50° C.,
(b) at least one is an aqueous stream,
(c) at least one is an oily stream containing at least part of the monomer composition,
(d) at least one stream contains a compound capable of dissociation into free radicals;

(2) Agitating the resulting mixture during the feeding step and for a short additional period thereafter, usually less than about one hour, until polymerization is substantially complete, i.e., less than about 2 percent of the monomer composition remains unpolymerized.

Often, however, the aqueous stream (especially when it contains a water-soluble catalyst) is fed "substantially concurrently" with the oily stream, i.e., starting at the same time as the oily stream but continuing during the feeding of the oily (monomer) stream and through at least a part of the short additional period defined above. Similarly, a separate oily stream containing an oil-soluble catalyst (when used), but no monomer, may be fed substantially concurrently.

The process of the invention may be used with any of the many ethylenically unsaturated compounds which will polymerize in aqueous emulsion by free-radical means. However, the process is especially advantageous and unexpectedly effective for those ethylenically unsaturated monomers which polymerize readily with a high heat of polymerization, which are highly flammable, which have a high vapor pressure, or to monomer mixtures which include such monomers, especially conjugated diethylenically unsaturated hydrocarbon monomers such as 1,3-butadiene and isoprene.

DETAILED DESCRIPTION OF THE INVENTION

The preferred conjugated diethylenically unsaturated hydrocarbon monomers for use in the practice of this invention are monomers of that class which are in the gaseous state at 35° C. when at atmospheric pressure (i.e., having a boiling point below 35° C.) such as isoprene and especially 1,3-butadiene. However, there may be used, in the process, if desired, other conjugated diethylenically unsaturated hydrocarbon monomers having a boiling point at atmospheric pressure of higher than 35° C. such as 2,3-dimethyl-1,3-butadiene, methylpentadiene; 3,4-dimethyl-1,3-hexadiene; and 4,5-dimethyl-1,3-octadiene.

The new process provides a more advantageous procedure for converting monomeric compositions containing such conjugated diethylenically unsaturated monomers to aqueous dispersions of polymers and copolymers, commonly called latexes. Among the emulsion-polymerizable, ethylenically unsaturated compounds with which the diethylenically unsaturated monomers may be copolymerized are the monovinylidene aromatic compounds, monoethylenically unsaturated carboxylic acids, the derivatives of ethylenically unsaturated acids such as the acrylic esters; acrylic nitriles; maleic esters; fumaric esters; unsaturated ketones; and other emulsion-polymerizable ethylenically unsaturated monomers well known in the art. Specific examples of the monomers copolymerizable with the conjugated diethylenically unsaturated hydrocarbon monomers are styrene, α-methylstyrene, ar-methylstyrene, ar-ethylstyrene, α-ar-dimethylstyrene, ar,ar-dimethylstyrene, ar-t-butyl styrene, vinyl naphthalene, methoxystyrene, cyanostyrene, acetylstyrene, monochlorostyrene, dichlorostyrene and other halostyrenes, vinylnaphthalene, methyl methacrylate, ethyl acrylate, butyl acrylate, hexyl acrylate, 2-ethylhexyl acrylate, lauryl methacrylate, phenyl acrylate, β-hydroxyethyl acrylate, 2-hydroxyethyl methacrylate, acrylonitrile, methacrylonitrile, ethyl α-chloroacrylate, diethyl maleate, vinyl methyl ketone, methyl isopropenyl ketone, vinyl ethyl ether, 2-cyanobutadiene-1,3, acrylic acid, methacrylic acid, fumaric acid, itaconic acid and the like. It should be recognized that the above is not an all-inclusive list but is representative of known monomers which may be copolymerized with the diethylenically unsaturated hydrocarbon monomers described above. The monomer compositions of choice for the practice of this invention contain at least about 30 percent by weight of such diethylenically unsaturated hydrocarbon monomers.

In this specification by the word "monovinylidene" in the term "monovinylidene aromatic" monomer or compound is meant that to an aromatic ring in each molecule of the monomer or compound is attached one radical of the formula,

wherein R is a hydrogen or a lower alkyl such as an alkyl having from 1 to 4 carbon atoms. The aromatic portion of the monomer may have other substituent radicals such as halo, alkyl, alkoxy. The term is also intended to include comonomeric mixtures of styrene with α-methylstyrene or one of the above-named monomers. Because of their availability and their ability to produce desirable polymers and for other reasons, it is preferred to use styrene and vinyl toluene as the monovinylidene aromatic monomer when a monomer of this class is to be used.

In the practice of this invention there may be used any of the well-known catalysts for emulsion polymerization, i.e., compounds which dissociate to produce free radicals. Such free-radical producing compounds are represented by, but not restricted to, per-oxygen compounds especially the inorganic persulfate compounds such as sodium persulfate, potassium persulfate, ammonium persulfate, the peroxides such as hydrogen peroxide and the organic hydroperoxides, for example cumene hydroperoxide, t-butyl hydroperoxide, the organic peroxides, for example, benzoyl peroxide, acetyl peroxide, lauroyl peroxide, peracetic acid, and perbenzoic acid—sometimes activated by a water-soluble reducing agent such as a ferrous compound or sodium bisulfite—and other free-radical producing materials such as 2,2'-azobisisobutyronitrile.

The initiators, or catalyst, preferably used in this invention are those compounds capable of thermal dissociation to produce free-radicals for which the half-life of such thermal dissociation is less than about 30 minutes at 90° C. Representative examples are the water-soluble inorganic peroxy compounds such as sodium persulfate, potassium persulfate, ammonium persulfate; certain organic oil-soluble compounds such as peracetic acid and 2-azobisisobutyronitrile. Especially preferred are the alkali metal persulfates and ammonium persulfates.

Some representative values for the rate of thermal dissociation of illustrative initiators expressed in terms of the half-life at the indicated temperature are given in Table I.

TABLE I

| Compound | Temperature degrees C. | Half-life minutes |
|---|---|---|
| Potassium persulfate* | 80 | 100 |
| Do* | 90 | 26 |
| Do* | 100 | 7 |
| 2,2'-azobisisobutryronitrile | 80 | 70 |
| Do | 90 | 20 |
| Do | 100 | 6 |

*Determine in aqueous solution buffered at pH of 4-12.

As mentioned, the present invention resides in the area of emulsion polymerization. As is known in this field, the preparation of a polymer latex employs many different non-polymerizable components whose functions to a great extent are interdependent. The invention contemplates the use of these prior known non-polymerizable components in emulsion polymerization technology. Thus the aqueous dispersion may include pH adjusting agents, buffers, accelerators, chelating agents, stabilizers, emulsifiers and similar ingredients.

Emulsifiers are often advantageously added to the aqueous dispersion for stabilization of the dispersion and/or to provide particle size control. Usually at least one anionic emulsifier is included and one or more of the known non-ionic emulsifiers may also be present. Representative types of anionic emulsifiers are the alkyl aryl sulfonates, the alkali metal alkyl sulfates, the sulfonated alkyl esters, the fatty acid soaps and the like. Specific examples of these well-known emulsifiers, for the purpose of illustration and not for limitation, are dodecylbenzene sodium sulfonate, sodium butyl naphthalene sulfonate, sodium lauryl sulfate, disodium dodecyl diphenyl ether disulfonate, N-octadecyl disodium sulfosuccinate and dioctyl sodium sulfosuccinate. Other species of useful anionic emulsifying agents will be known. Typical non-ionic emulsifiers (surfactants) are compounds formed by the reaction of an alkylene oxide, such as ethylene oxide, propylene oxide, or butylene oxide with long chain fatty alcohols, long chain fatty acids, alkylated phenols, long chain alkyl mercaptans, long chain alkyl primary amines, for example, cetylamine; the alkylene oxides being reacted in a ratio such as 5 moles to 20 moles or higher such as up to 50 moles per mole of the coreactant. Similarly effective compounds are monoesters such as the reaction products of a polyethylene glycol with long chain fatty acids, for example, glycerol monostearate, sorbitan trioleate, and partial and complete esters of long chain carboxylic acids with polyglycol ethers of polyhydric alcohols. By "long chain" in the above description usually is meant an aliphatic group having from six carbon atoms to 20 or more. For some applications and for some latexes, emulsifiers of the cationic type are used, either alone or with emulsifiers of the non-ionic type. Representative classes of cationic emulsifiers are salts of aliphatic amines, especially the fatty amines, quaternary ammonium salts and hydrates, fatty amides derived from disubstituted diamines, fatty chain derivatives of pyridinium compounds, ethylene oxide condensation products of fatty amines, sulfonium compounds and phosphonium compounds. Specific examples of the cationic surfactants (or emulsifiers) are dodecylamine acetate, dodecylamine hydrochloride, tetradecylamine hydrochloride, hexadecylamine acetate, lauryl dimethylamine citrate, octadecylamine sulfate, dodecylamine lactate, cetyl trimethyl ammonium bromide, cetyl pyridinium chloride, stearyl dimethyl benzyl ammonium chloride, cetyl dimethyl amine oxide, stearamido propyl dimethyl-β-hydroxyethyl ammonium phosphate, cetyl dimethyl benzyl ammonium chloride, tetradecylpyridinium bromide, diisobutyl phenoxy ethoxy ethyl dimethyl benzyl ammnoium chloride, resin amine ethoxylate, oleyl imidazoline, octadecyl sulfonium sulfate, benzyl dodecyl methyl sulfonium bromide and the like. Combinations of two or more emulsifying agents from one or more of the classes may be employed if desired for special effects.

It is often preferable to the attainment of optimum polymer properties that a chain-transfer agent be present. Typical of such chain-transfer agents are lauryl mercaptan, t-dodecyl mercaptan, carbon tetrachloride, and diisopropyl dixanthogen. Other useful chain-transfer agents will be known. It is also possible to employ combinations and mixtures of such chain-transfer agents. The concentration of the chain-transfer agent will vary with the efficiency of the specific agent used and to a lesser extent with the amount of conjugated diene present. The optimum amount in any case is that minimum necessary to attain the desired latex product. That optimum concentration is readily determined by simple preliminary experiment.

It is generally accepted in emulsion polymerization technology that agitation is required to form the dispersion initially and to maintain the dispersion throughout polymerization. The rate of agitation to be used in any particular instance will be dependent primarily on the overall design of the polymerization equipment. The minimum amount or agitation required to form and to maintain the dispersion is usually to be desired.

For many uses, it is desirable to have latexes having polymer solids within the range of from about 20 to 60 percent by weight. Where there is significantly less than about 20 percent solids, it is difficult to attain continuous, coherent films by simple deposition and drying. Furthermore, latexes having appreciably less than about 20 percent solids are uneconomical to prepare. Latexes containing appreciably more than 60 percent solids are difficult to prepare and when made are likely to be unduly sensitive to mechanical shearing forces. However, the present invention is not limited to any given amount of solids content.

As is known, many latex properties are dependent upon the particle size of the polymer. The present invention is operable with latexes of any useful particle size.

By using the previously described monomers, initiators, aqueous media and any desired optional components, the process of this invention is carried out by (1) Substantially concurrently and continuously feeding the components in at least two separate streams into a closed polymerization zone maintained at a temperature of at least about 90° C. and generally less than about 150° C. under autogenous pressure, (2) Agitating the resulting mixture during the feeding step and for a short additional period thereafter until polymerization is substantially complete. Such additional period is usually less than about one hour.

The process requires at least one aqueous stream and at least one oily stream which, while at a temperature between their respective freezing points and 50° C., are fed substantially continuously and substantially concurrently into the polymerization zone. If a water-soluble initiator is used, it usually is mixed with the water and the other water-soluble ingredients of the recipe to form a single aqueous stream. However, if desired a water-soluble initiator may be fed into the polymerization zone as a separate stream concurrently with other streams. Similarly an oil-soluble initiator may be included in the oily stream or may be metered in separately, substantially in a continuous manner. When the monomers being polymerized include a monomer which is water-soluble, optionally, that monomer may be mixed with the aqueous stream. The feeding step may be stopped at any desired time but the maximum is limited by the capacity of the reactor or polymerization zone. However, the catalyst streams need not be continuous when they contain solutions or dispersions of the catalyst only. Similarly, when the catalyst is introduced by means of an oily stream containing monomers or in an aqueous stream containing non-catalyst components, the catalyst need not be present during the entire time of the feeding of that stream. The term "substantially continuously" is construed to mean that the action referred to is either carried on continuously, although not always at the same rate during a given period, or is carried out at closely spaced intermittent portions, that is numerous shot-wise additions. Likewise, when applied to the feeding of two or more streams, the term does not exclude short, temporary interruptions of one or more of such streams during the period required for completion of the process. In this specification, the term "substantially continuous stream" refers to a stream according to the above description.

In addition to the requirements for the process of this invention as hereinbefore described, optionally there may be included an additional step or stream component, generally known as a "seed" step or "seed" latex. In general, the seed latex, if used, usually is prepared by conventional methods from approximately the same monomeric composition as is used in the main process for this invention. Often the polymerization conditions for the seed latex are selected such that the particle size of the seed latex is smaller than that of the product of the complete process. In the process of the invention, the seed latex (when used) may be prepared in the reactor before starting the continuous streams or a preformed seed latex may be introduced into the polymerization zone as a component of a continuous aqueous stream, or as a separate, continuous aqueous stream concurrently with the required streams of the process, or alternatively may be introduced completely before starting feeding the continuous streams. In any event the quantity of seed latex used is such that the amount of polymer contained therein is less than about 25 parts by weight per 100 parts of monomer in the continuous streams.

Often, in carrying out the process some of the water which is required to obtain a latex of the desired solids concentration and optionally an emulsifier and/or some of the water-soluble materials of the recipe (other than the catalyst) are added to the reactor before starting the continuous feed streams. This added step is mainly to provide sufficient material within the reactor to allow the temperature controls on the equipment to function properly. This is considered as more of a limitation in the equipment which has been used rather than a limitation inherent in the method.

The higher polymerization temperature of the present process provides a larger temperature differential between the reactor contents and the reactor cooling means—thus allowing a faster rate of heat removal. Raising the temperature of the material in the feed streams to the reaction temperature from their entering temperature of less than 50° C. also dissipates some of the heat generated by the polymerization reaction. Thus the combination of the invention results in more effective heat removal so that the polymerization reaction can be carried out at a faster rate—safely. Furthermore, in the preferred embodiments, since the monomer stream and the aqueous stream containing the catalyst (initiator) are fed in substantially continuously rather than at the beginning and additionally since at temperatures greater than 90°, the rate of propagation in the polymerization reaction is much faster than at lower temperatures and because the initiator of choice decomposes to free radicals very rapidly, there is not a large quantity of unpolymerized monomer and unused catalyst at any time during the reaction period. Hence, the runaway reaction is avoided and greatly increased rates of production are achieved.

The latexes resulting from the process of this invention may be formulated with the conventional and common additives, such as pigments, dyes, fillers, stabilizers, preservatives, thickeners, and the like, which are commonly incorporated in paints, adhesives, and similar compositions. The latexes may be blended with other known latexes if desired. Frequently it is desirable to post-stabilize the latexes by incorporating therein small but significant amounts of wetting agents which may be the same as, or different from, the emulsifiers used in preparing the latexes.

The process of this invention permits polymerization of the monomeric ingredients in larger vessels at higher temperatures and at much higher rates than conventional batchwise polymerization. The present process minimizes runaway polymerizations and hot spots and provides better temperature control with a consequently more uniform product from batch to batch.

The operation of the process, as well as the benefits and advantages that accrue therefrom, will be illustrated by the following examples which should not be construed as limitations. In the examples all parts and percentages are by weight.

EXAMPLE 1

To a pressure vessel was added 500 pounds of distilled water, 1.33 pounds of a sodium lauryl sulfate paste (30 percent active), and 8.0 pounds of potassium bicarbonate. The resulting solution was stirred and heated to 90° C., then the reactor was sealed and purged with butadiene to expel air. A mixed monomer stream at about 25° C., consisting of a previously prepared monomer solution of 480 pounds of styrene and 270 pounds of 1,3-butadiene, was pumped into the reactor at a rate of 150 pounds per hour for five hours. Starting at the same time as the monomer stream, an aqueous composition at about 25° C., previously prepared from 188 pounds of distilled water, 9.6 pounds of a commercial sodium lauryl sulfate paste (30 percent active), and 6.9 pounds of sodium persulfate, was pumped into the reactor at a rate of 34.2 pounds per hour for six hours. The temperature within the reactor was maintained at 90° C. for six hours while the feed streams were being added and for an additional 45 minutes; stirring was continuous during the run, and the highest pressure reached was 80 p.s.i.g. There was obtained thereby a copolymer latex having an average particle diameter of 2020 angstroms and a solids concentration of 52.1 percent.

Substantially the same results are obtained when ammonium persulfate is substituted for the potassium persulfate in the above described process.

In comparison with, and in contrast to, the above example of the invention, another latex (not an example of the invention) was prepared from the same ingredients in the same proportions as in Example 1 by polymerizing under a conventional batch procedure in which all of the ingredients were charged to the reaction vessel, then polymerization was carried out by heating with agitation at 70° C. A period of about 11 hours was required to obtain the same degree of conversion as was obtained in Example 1.

EXAMPLE 2

By substantially the same procedure described in Example 1, other latexes were prepared with similar advantageous results from the following monomer mixtures containing at least 30 percent by weight of 1,3-butadiene:

(a) styrene and 1,3-butadiene,
(b) styrene, 1,3-butadeine and acrylic acid,
(c) styrene, 1,3-butadiene and methacrylic acid,
(d) styrene, 1,3-butadiene, acrylic acid and fumaric acid,
(e) styrene, 1,3-butadiene and 2-hydroxyethyl acrylate,
(f) styrene, 1,3-butadiene, itaconic acid and 2-hydroxyethyl acrylate.

Stable latex products were obtained of commercially acceptable quality.

What is claimed is:

1. In a method for preparing a synthetic latex by emulsion polymerization of a monomer composition containing at least one polymerizable ethylenically unsaturated monomer, said polymerization being catalyzed by dissociation of free-radical producing compounds; the improvement consisting of the combination comprising the essential steps of (a) substantially concurrently and substantially continuously feeding at least two separate streams at a temperature between their freezing point and 50° C. into a closed polymerization zone maintained at a temperature of at least about 90° C. and under autogeneous pressure; at least one of said streams being an aqueous stream and at least one of said streams being an oily stream containing at least a portion of the monomer composition; the feeding of the streams being for a time limited by the capacity of the polymerization zone; (b) agitating the resulting mixture during the feeding step and for a short additional period thereafter until polymerization is substantially complete; said monomer composition containing at least 30 percent by weight of a conjugated diethylenically unsaturated hydrocarbon monomer which is of the class which is in the gaseous state when at 35° C. and atmospheric pressure.

2. The method of claim 1 in which the diethylenically unsaturated monomer is 1,3-butadiene.

3. The method of claim 1 in which the free-radical producing compound is an alkali metal persulfate.

4. The method of claim 1 in which the free-radical producing compound is ammonium persulfate.

5. The method of claim 1 in which the free-radical producing compound is fed substantially continuously into the polymerization zone.

6. The method of claim 1 in which the free-radical producing compound is included in a substantially continuous aqueous stream.

7. The method of claim 1 which includes, as an additional component, a preformed latex in a quantity such that the polymer contained therein is in an amount less than about 25 parts per 100 parts of the monomer composition; said preformed latex having a particle size smaller than the particle size of synthetic latex product.

8. The method of claim 7 in which the preformed latex is prepared from approximately the same monomeric composition as the monomer composition of claim 1.

9. The method of claim 2 in which the monomer composition also contains styrene.

References Cited

UNITED STATES PATENTS

| 2,232,515 | 2/1941 | Arnold et al. | 260—29.7 |
| 2,392,585 | 1/1946 | Fryling | 260—29.7 |
| 2,787,609 | 4/1957 | Bennett | 260—83.7 |
| 2,537,334 | 1/1951 | De Nie | 260—29.6(EM) |
| 3,073,791 | 1/1963 | Barkhuff | 260—29.6(EM) |
| 3,296,175 | 1/1967 | Fantl et al. | 260—29.6(H) |

FOREIGN PATENTS

| 627,265 | 8/1949 | Great Britain | 260—29.6(RU) |

MURRAY TILLMAN, Primary Examiner

W. J. BRIGGS, Sr., Assistant Examiner

U.S. Cl. X.R.

260—23.7, 78.5, 82.1, 82.3, 83.5, 83.7, 94.2, 95, 879